United States Patent [19]
van Vugt

[11] Patent Number: 4,718,058
[45] Date of Patent: Jan. 5, 1988

[54] DIGITAL SWITCHING NETWORK FOR SWITCHING SIGNALS OF DIFFERENT BIT RATES

[75] Inventor: Franciscus J. van Vugt, Zoetermeer, Netherlands

[73] Assignee: Staat Der Nederlanden, The Hague, Netherlands

[21] Appl. No.: 702,122

[22] Filed: Feb. 15, 1985

[30] Foreign Application Priority Data

Feb. 24, 1984 [NL] Netherlands .......................... 8400588

[51] Int. Cl.$^4$ ............................................. H04Q 11/04
[52] U.S. Cl. ......................................... 370/63; 370/58
[58] Field of Search ....................... 370/58, 63, 64, 53, 370/84, 68, 66, 67

[56] References Cited

U.S. PATENT DOCUMENTS

| | | |
|---|---|---|
| 3,639,693 | 2/1972 | Bartlett et al. |
| 3,697,696 | 10/1972 | Verstegen .............................. 370/64 |
| 4,173,713 | 11/1979 | Giesken et al. ........................ 370/64 |
| 4,206,322 | 6/1980 | Lurtz ..................................... 370/63 |
| 4,258,434 | 3/1981 | Glowinski et al. ................... 370/67 |
| 4,355,384 | 10/1982 | Genter et al. ......................... 370/64 |
| 4,412,322 | 10/1983 | Briley et al. |

FOREIGN PATENT DOCUMENTS

| | | |
|---|---|---|
| 7412197 | 9/1974 | Netherlands . |
| 7909226 | 7/1981 | Netherlands . |
| 2000418 | 1/1979 | United Kingdom . |

OTHER PUBLICATIONS

International Switching Symposium, Jun. 1972, Cambridge, Mass., "A Digital Data Exchange", pp. 234–242.
International Switching Symposium, Jun. 1972, Cambridge, Mass., "Bit Interleaved PCM Transit Switching Networks", pp. 45–54.
Proceedings of the IFIP TC-6 Working Conference Comnet '81, 11–15 May, pp. 331–345, "Time Division Switching Networks Evaluation for Data Handling at a Plurality of Speeds" by H. Okazaki and H. Miyamoto.
"Services and Networks of Future Telecommunications" by T. Larsson and G. Rasmuson, published in Tele, vol. 33 (1981), No. 2, pp. 1–6.
Proceedings 9th Int. Teletraffic Congress, Torremolinos, "Evaluation of Traffic Carrying Capability in One-Stage & Two Stage Time-Division Networks Handling Data with a Variety of Speed Classes" by T. Saito & H. Inose, pp. 1–6.
l'Onde Electrique, vol. 62 (1982), No. 11, Nov., pp. 67–73, "La Commutation Temporelle Asynchrone, un Nouveau Concept pour les Noeuds de RNIS" by M. Devault et al.
Computer Networks, vol. 5 (1981), No. 6, pp. 411–422, "Office Communications and the Digital PABX", by J. Richter et al.
Electronic Design, Jun. 24, 1982, pp. 73–82, "PABX's Equip Themselves for the Future Office", by R. Allan.

*Primary Examiner*—Robert L. Griffin
*Assistant Examiner*—Wellington Chin
*Attorney, Agent, or Firm*—Frishauf, Holtz, Goodman & Woodward

[57] ABSTRACT

Digital switching network for switching through subrate channels. The multiplexed subscriber's channels contain eight-bit words, each bit of which can form part of another signal. The number of bits in each word for a single signal is determined by the original rate of the signal. Each of the signals must have the possibility of being switched through to another destination. For that purpose it may be necessary to change the position of bits within a frame. Hence a separate time and space stage has been arranged between the input time stage and the switching matrix. After that the switching matrix switches through eight-bit words. The positions of bits within a word can be exchanged in an additional space stage between the switching matrix and the output time stage in order to make it possible to fill the outgoing frames as completely as possible.

4 Claims, 5 Drawing Figures

DIGITAL SWITCHING NETWORK FOR SWITCHING SIGNALS OF DIFFERENT BIT RATES

BACKGROUND OF THE INVENTION

1. Field of the invention

The invention relates to a digital switching network for switching digital signals of different rates contained in a multiplexed channel, which is divided into frames, words with a fixed number of bits per time slot being switched through every time, which switching network comprises for each of the multiplexed channels an input stage and an output step and a common switch step for each of the channels to be switched through. The use of such switching networks can particularly takes place in the case when multiplexed signals which originally have different rates are supplied by one or more subscribers, and are intended for several other subscribers. In this connection it is convenient to consider the case of subscribers who transmit signals for telephone traffic and data communication in one 64 kbit/s channel.

2. State of the art

A switching network of the sort described is known from reference D1. A drawback of this proposal is that signals with a low rate are collected till an eight-bit word is full, so that inadmissible delays can occur.

A proposal known from reference D2 describes a switching network which switches through bit by bit, due to which, it is true, a quick switching through is effected, but, on the other hand, the limit of the switching capacity of the network is already reached with a relatively small number of channels.

A proposal to have each signal switched at a certain rate by a separate switching network is known from reference D3. In practice this procedure, however, leads to a rather extensive switching system with relatively much idle time.

SUMMARY OF THE INVENTION

It is an object of the present invention to provide a switching network of the sort described above, capable of switching through not only input signals of the lowest rate, but also signals of $N(N=1, \ldots, 8)$ times the lowest rate within the same time. An attendant problem is that the position of a signal in a word in an outgoing frame can differ from the position which the signal that has to be switched through takes in a word in an incoming frame. To solve this problem the switching network according to the invention is characterized in that each input stage comprises first means capable of changing the position of one or more bits within a frame, and in that each output step comprises second means capable of changing the position of one or more bits within a word switched through by the switch stage. In consequence of this it is achieved that bits within one and the same incoming word can be switched through to an identical bit position of different outgoing words, and besides that bits in the same bit position within different incoming words can be switched through to one and the same outgoing word. In this case the switching nework according to the invention switches through complete words, capable of containing signals of more than one channel, in parallel, and also due to this fact it has a very high capacity.

SHORT DESCRIPTION OF THE DRAWINGS

The invention will be further explained hereinafter with the help of the drawings in which is represented by
FIG. 1 a circuit diagram of the network according to the invention;
FIG. 2 a possible frame construction of the signals in an incoming or outgoing frame;
FIG. 3 time diagrams of a number of possible bit position changes;
FIG. 4 an elaborate block diagram of a preferred embodiment of the switching network according to the invention;
FIG. 5 a switching-through diagram of a number of bits.

REFERENCES

1. Netherlands patent application No. 7412197.
2. European patent application No. 41001.
3. IEEE International Switching Symposium record; June 6–9, 1972; Article: "A digital data exchange"; pp. 234 up to 242 inclusive; Authors: J. Adam and A. Orbell.

DESCRIPTION OF THE EMBODIMENT

In the circuit diagram according to FIG. 1 a series of 8-bit words is supplied in parallel to an input 1. This signal comprises a number—e.g. 16— of PCM-systems of 2.048 Mbit/s in a multiplexed form. The 8-bit words are recorded in an input buffer 2, which is formed by a randomly accessible store (RAM) with a width of 8 bits and a length of 512 bits. The only function of the input buffer 2 is to adapt the signals of the external incoming time regime Ti to the first internal time regime Ta. The 8-bit words are sequentially recorded line by line in the input buffer 2 and read out again in the same sequence. Via an eight-wire bus 3, of which each of the connections will also be designated by path hereinafter, the contents of each of the lines of the input buffer are supplied by a space switch stage 4 to a time switch stage 6 via an eight-wire bus 5. The switch stage 4 preferably has the design of an 8×8 space switch stage, but can also have the design of a time switch stage. In that case the function remains the same, viz. to render it possible to change the position of bits within each word. The time stage 6 has the design of a RAM consisting of eight separate columns with a column size of 512 bits, each column being controlled by a separate route store. The recording in time stage 6 takes place under the control of route stores, whereas the reading out takes place cyclically. The function of the time stage 6 is to collect bits, which can come from different incoming words, and which have to be switched through on the same line at the same moment. This function has been made possible by controlling the eight columns of the time stage 6 by eight different route stores. Via an eight-wire bus 7 the signal is supplied to an eight-plane spatial switch stage 8, the dimensions of which will be given later on. The eight planes of this switch stage 8 are controlled by separate route stores. In this way eight bits can be switched through in parallel. The eight bits on bus 7 can be switched through to eight different busses 9. Via an eight-wire bus 9 the bit streams which have been switched are now supplied to a spatial switch stage 10, which preferably has the design of an 8×8 spatial switch stage, but which can also have the design of a time switch stage. In that case the function remains the same, viz. to render it possible to change the position of bits within each word. The switch stage 10 consists of eight columns and eight rows, and each of the columns can be switched to each of the rows. The output of the switch stage 10 is connected to an output time stage 12 by means of an eight-wire bus 11. The time step 12 is formed by a randomly accessible store (RAM) with a width of 8 bits and a length of 512 bits. The recording in time stage 12 takes place under the control of a route store. The signals which have been cyclically read out are supplied to an output 13.

The signals

The aggregate signals supplied to each of the inputs 1 and at each of the outputs 13 of this embodiment have a rate of 32.768 Mbit/s. They can contain 16 multiplexed 2.048 Mbit/s signals, which can each consist of 32 multiplexed 64 kbit/s signals. The rate of 64 kbit/s can be the rate of a subscriber's channel. Such a subscriber's channel can contain signals of different rates for different destinations. Although the switching network according to the invention is suited to switch multiples of 8 kbit/s to a maximum of 64 kbit/s, the rates in the examples will be limited to the multiples 8 kbit/s, 16 kbit/s, 32 kbit/s and 64 kbit/s. It will be clear that a 64 kbit/s channel can be filled with combinations of different signals, e.g. 8 signals of 8 kbit/s, 2 signals of 16 kbit/s and one signal of 32 kbit/s and so forth.

FIG. 2 shows an example of a possible construction. A word I contains one 64 kbit/s signal (A), a word II contains one 32 kbit/s signal (B) and two 16 kbit/s signals (C), a word III contains one 16 kbit/s signal (C), two 8 kbit/s a signals (D) and one 32 kbit/s signal (B), and a word IV contains three 16 kbit/s signals (C) and two 8 kbit/s signals (D). The problem underlying the invention will arise when one or more of the signals occurring within a 64 kbit/s channel have to be switched through to several outgoing 64 kbit/s channels and, besides, have also to take other positions within the outgoing 64 kbit/s channels than within the incoming 64 kbit/s channel, for in the outgoing channels the position of the bits that have to be switched through cannot always be freely chosen. Two different problems, indicated in FIG. 3, may occur in this case.

The switching network according to the invention manages to switch through one word of each of the inputs per time slot, though the maximum switching-through delay amounts to only one frame more than with the known switching networks of this sort, which can switch through only eight-bit words.

Figure 1:
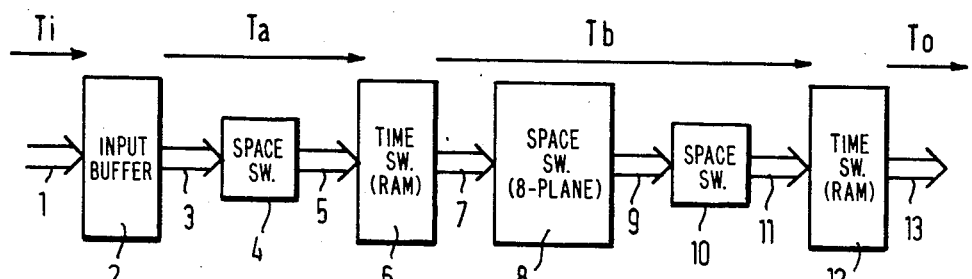
Figure 2:
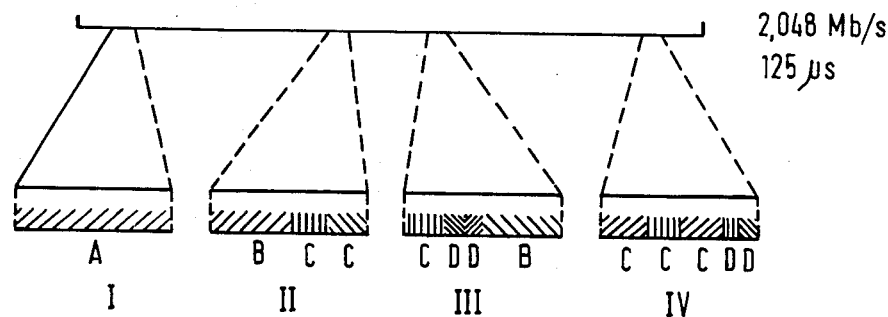
Figure 3:
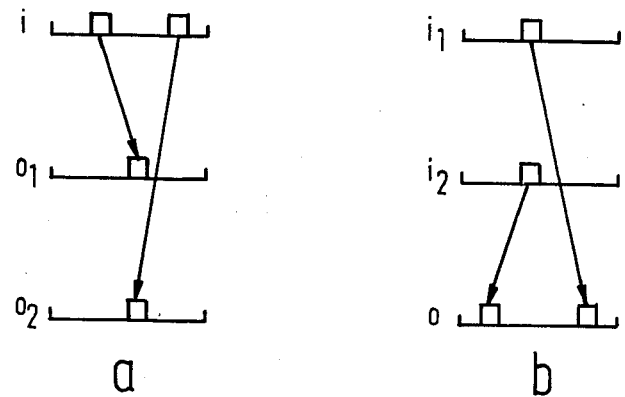
FIG. 3a shows the situation in which two bits from one and the same incoming word (i) have to be switched through to identical positions within two different outgoing words ($O_1$, $O_2$).
FIG. 3b shows the situation in which two bits occurring in the same position within two different words ($i_1$, $i_2$) have to be switched through to one and the same outgoing word (o).

The present switching network knows four time regimes (vide FIG. 1): the one at the input ($T_i$), the one between the input buffer 2 and the time stage 6 ($T_a$), the one between the time stage 6 and the output buffer 12 ($T_b$) and the one at the output ($T_o$). When the signals are switched through, a switching-through delay of not more than one frame can occur when changing over from the one time regime to the other one. The total number of such changes-over will be three, so that the total switching-through delay will amount to not more than three frames. Consequently, the delay going round will remain below the six frames (750 µs), which will not cause any hindrance.

Another fringe condition is that it must be possible to switch through a great number of connections simultaneously in order to obtain a sufficiently high capacity.

The complete block diagram

Figure 4:
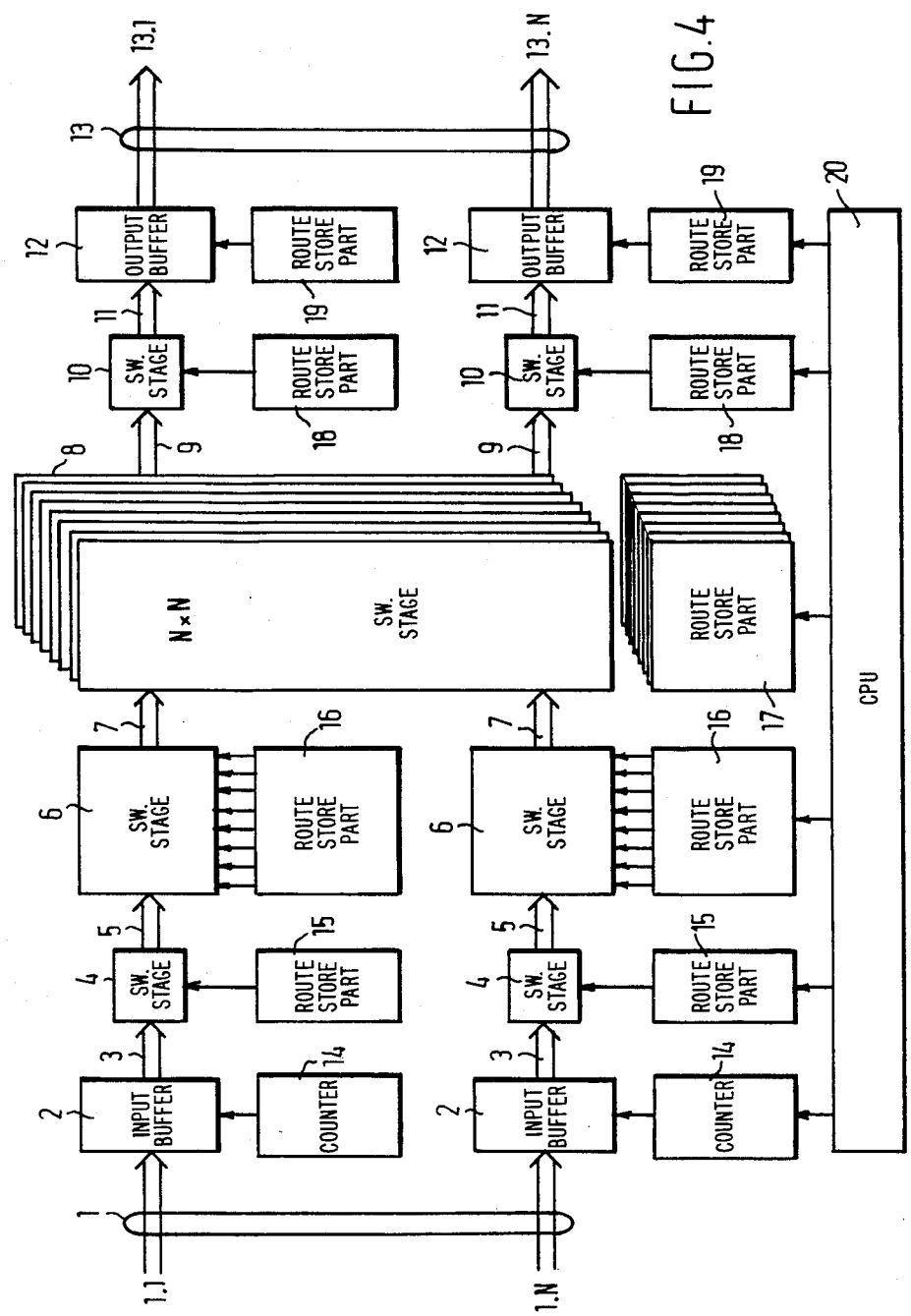

FIG. 4 shows a diagram of a preferred embodiment of the switching network suited for N input signals of the sort described above. The switching network has N eight-wire input busses 1, and an input buffer 2, a switch stage 4 and a time stage 6 have been provided for each input bus. For each of the eight-wire output busses 13 there are provided a switch stage 10 and an output buffer 12. Each of the input buffers 2 is read out in a numerical sequence under the control of a counter 14. The bit position within a word or octet determines via which path of bus 3 the transfer of a bit to the switch stage 4 will take place. Consequently, the lines of the switch stage 4 on which the signal of bus 3 will enter, are determined by the positions of the bits within a word. The column to which a bit is switched depends on the position the bit has to take within an outgoing time slot. The destination of each bit which has to be switched through, is known to a central processing unit 20, which provides the parts 15, 16, 17, 18 and 19 of the route stores with the information needed for setting the switch stages 4, 6, 8, 10 and 12, respectively. The signal coming from the columns of the switch stage 4 is recorded octet by octet in the time stage 6. The recording in the time stage 6 takes place under the control of a part 16 of the route store. This part consistis of eight separate columns, each of which controls a separate column of the time stage 6. The line of the part 16 on which the switch information is recorded is determined by the number of the incoming time slot, the column through the path on the busses 5, 7 and 9. The path on the busses 5, 7 and 9 is the same for a certain signal. The switch information itself is dependent on the point of time at which the signal will be read out from the time stage 6. Each column of the time stage 6 will be switched through by a separate plane of the switch stage 8. Each of the planes of the switch stage 8 is set by a separate part 17 of the route store. The line of the part 17 of the route store on which the switch information is recorded, is determined by the moment of switching through through the switch step 8, the column by the number of the incoming input 1, and the switch information itself by the number of the output 13. The signal is switched through via bus 9 to one of the space stages 10, ensuring a proper positioning of the eight bits within a word. The space stage 10 is controlled by a part 18 of the route store, the line of which is determined by the time slot number of $T_b$, the column by the path on the busses 5, 7 and 9, and the setting information by the bit position within the outgoing time slot. In this way a possible change of the bit positions within one and the same word is ensured. Finally the output buffer 12 is controlled by a part 19 of the route store of which the line on which the setting information is recorded, is determined by the time slot number of $T_b$ and the setting information itself by the line number of the output buffer 12. Because of the fact that the output buffer 12 is read out cyclically, the line number of the buffer will correspond with the number of the outgoing time slot. All the parts 15, 16, 17, 18 and 19 of the route store consist of stores which can be read out cyclically and the contents of which are determined and recorded by the central processing unit 20.

Figure 5:
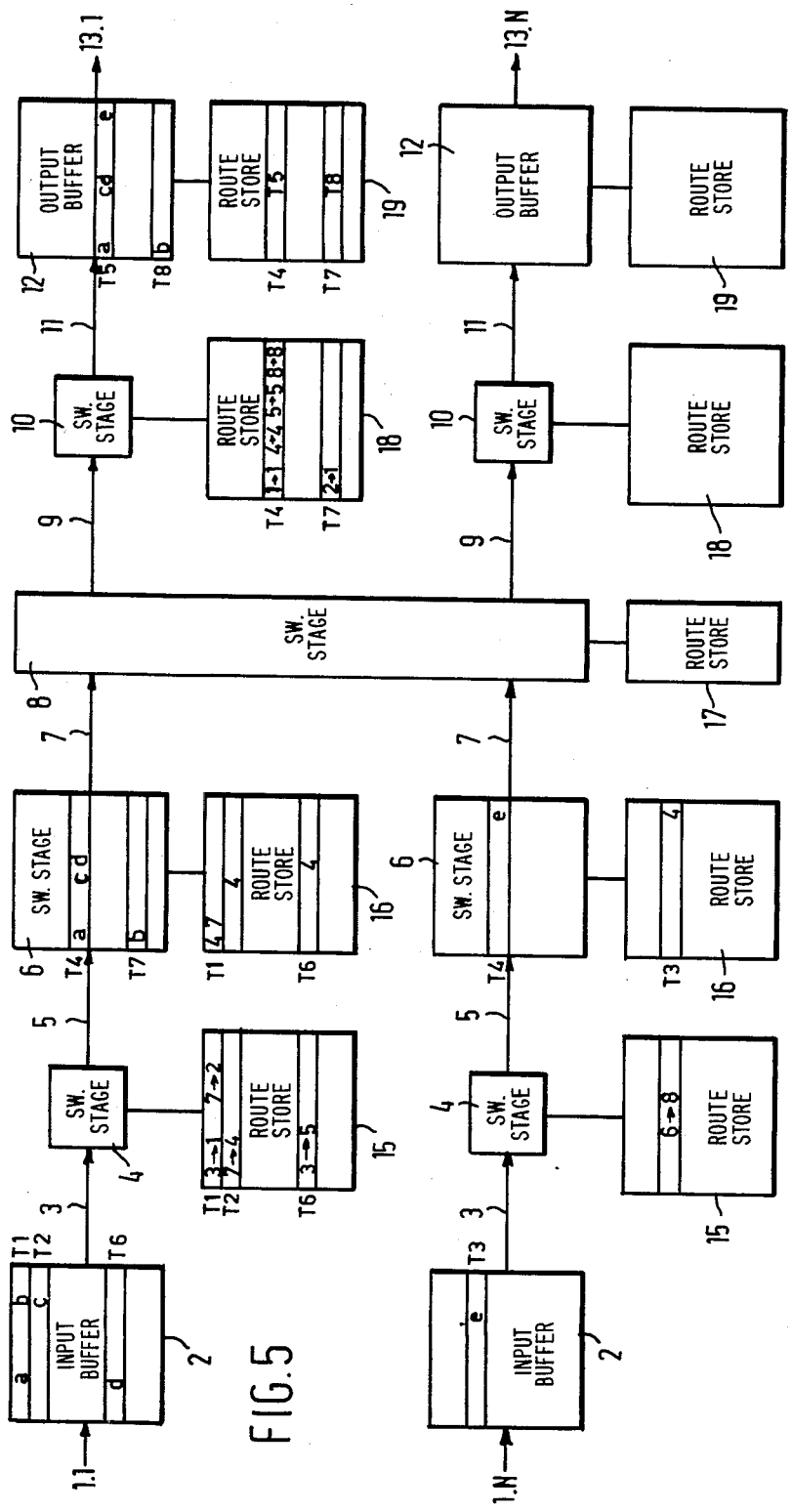

FIG. 5 exemplifies the way in which a number of bits can be switched through. The bits a, b, c and d entered at the input 1.1 have to be switched through to the output 13.1, namely to the first position of the word of the outgoing time slot 5, the first position of the word of the outgoing time slot 8, and the fourth and the fifth position of the word of the outgoing time slot 5, respectively. The bit e entered at the input 1.N has to be switched through to the eighth position of the time slot 5 of the output 13.1. The central processing unit 20 knows which bit positions are available in the words and deduces, in the usual way, the destination of each bit from the signalling which has come in and which can be supplied via a separate signalling channel. All the bits a, c, d and e have to be switched through to the outgoing time slot 5 of the output 13.1. Said bits can be switched to the proper positions within a word by means of the switch stage 4; e.g. bit a is switched from the third position to the first position. To switch bit b too to the proper position within a word cannot be achieved by means of switch stage 4, for the bits a and b are switched by switch stage 4 at the same moment and they would both have to be switched to the first position within a word. Hence bit b will have to take a position within a word after the switch stage 4, which position does not yet correspond with the final position within the outgoing word. In the example it is assumed that this temporary position is the second position. After the switch stage 4 the different bits are recorded in the time switch stage 6 under the control of part 16 of the route store. As switch stage 6 is controlled by eight columns in part 16 of the route store, it will be possible to record the eight bits which enter simultaneously, on different lines of switch stage 6 via bus 5; in this way the bits a and b, which enter simultaneously, are recorded on the lines 4 and 7, respectively, of the switch stage 6. The bits a, c, d and e, entering at different moments, are recorded on the same line, to wit line 4, in the switch stage 6, because all these bits have to be switched through to the same outgoing time slot, to wit time slot 5, of the output 13.1. The eight columns of switch stage 6 are switched through via the different planes of the switching matrix 8. The first column of the time stage 6 is switched through by the first plane of the switching matrix 8, the second column by the second plane, and so forth. All the bits a, c, d and e are switched through in the time slot 4 via the first, the fourth, the fifth and the eighth plane, respectively, of the switching matrix 8. The bit b is switched in time slot 7 via the second plane. In time slot 4 said planes have been set in such a way that all the bits a, c, d and e will be switched through to the same path of bus 9. In time slot 7 the second plane of switching matrix 8 has been set in such a way that bit b will be switched through to the proper path of bus 9. In time slot 4 the bits a, c, d and e are switched through by switch stage 10. Because of the fact that these bits have already been switched to the proper positions within a word by the switch stage 4, the positions of these bits within a word need not be changed any more by the switch stage 10. In time slot 7 the bit b is switched through by switch stage 10. As this bit could be switched to the proper position within a word by switch stage 4, it has to be switched to the proper position, to wit from position 2 to position 1, by switch stage 10. The part 19 of the route store ensures that each word is recorded on the proper line of the switch stage 12. Thus the word entering time slot 4 via bus 11 is recorded on line 5 of switch stage 12; this word contains the bits a, c, d and e. The word entering time slot 7 via bus 11 is recorded on line 8 of switch stage 12; this word contains the bit b. Switch stage 12 is read out cyclically, so that the bits a, c, d and e will appear in the outgoing time slot 5 and the bit b will appear in the outgoing time slot 8 of the output 13.1.

In the way described above each bit can be switched through from any incoming frame to any outgoing frame. However, the advantage that the present switching network switches on the octet basis remains, so that the capacity and the rate of the switching network are high compared with the known switching networks for switching through signals of different rates.

I claim:

1. A multi-rate digital switching network for handling data transferred in multibit time slots each containing a predetermined number of bit positions for transmission of a multibit word and carrying bits of channels having different rates, namely a lowest rate and higher rates which are a plurality of integral multiples thereof, comprising:

input switching means having an entrance side and an exit side, for switching bits from any said bit position in a word time slot at said entrance side to any bit position in a word time slot, not necessarily the same word time slot, at said exit side, said input switching means including first auxiliary switching means for switching individual bits from one word time slot to another, including switching of bits having the same bit positions from different word time slots at said entrance side to one and the same word time slot;

intermediate switching means having several entries coupled to said exit side of said input switching means, and several exits, for switching bits at any of said entries from one and the same entry to different exits;

and output switching means having an input side coupled to said several exits of said intermediate switching means, and an output side, for switching bits from any bit position at said input side to any bit position of an outgoing word time slot at said output side, said output switching means including second auxiliary switching means at said input side coupled to said several exits of said intermediate switching means for switching bits in any word time slot from one and the same incoming word time slot to the same bit position of different outgoing word time slots, all of said switching means beng constituted to switch bits simultaneously in sets of said predetermined number of bits.

2. A multi-rate digital switching network as defined in claim 1, wherein said intermediate switching means is a space switching means including eight switching planes, each of which is controlled by a separate routing memory, whereby it is possible to switch different bits from one octet of bits present at one of said entries to different exits of said intermediate switching means.

3. A multi-rate digital switching network for handling data transferred in multibit time slots each containing a predetermined number of bit positions for transmission of a multibit word and carrying bits of channels having different rates, namely a lowest rate and higher rates which are a plurality of integral multiples thereof, comprising:

input switching means having an entrance side and an exit side, for switching bits from any said bit position in a word time slot at said entrance side to any bit position in a word time slot, not necessarily the same word time slot, at said output side, said input switching means including first space switching means (4) at said entrance side for switching the bit positions within a particular word time slot, including switching bits having the same bit positions from different word time slots to one and the same time slot, and time switching means (6) at said exit side, capable of collecting those bits which have to be switched to a particular outgoing word time slot;

intermediate switching means (8) having several entries coupled to said time switching means (6) and several exits, for switching different bits from one said word of bits on a certain one of said entries to different ones of said exits; and output switching means having an input side coupled to said several exits of said intermediate switching means, and an output side, for switching bits from any bit position of said input side to any bit position of an outgoing word time slot at said output side, said output switching means including second space switching means (10) at said input side coupled to said several exits of said intermediate switching means, said second space switching means (10) being capable of switching the bit positions within a particular word time slot, including switching bits in any word time slot from one and the same incoming word time slot to the same bit position in time of different outgoing word time slots, all of said switching means being constituted to switch bits simultaneously in sets of said predetermined number of bits.

4. A multi-rate digital switching network as defined in claim 3, wherein said intermediate switching means is a third space switching means of said network and includes eight switching planes, each of which is controlled by a separate routing memory, whereby it is possible to switch different bits from one octet of bits present at one of said entries to different exits of said intermediate switching means.

* * * * *